April 25, 1939.   J. M. BRYANT ET AL   2,155,584
METHOD OF MAKING BUSHINGS AND BUSHED CHAIN LINKS
AND THE ARTICLES PRODUCED BY SAID METHOD
Filed April 19, 1938
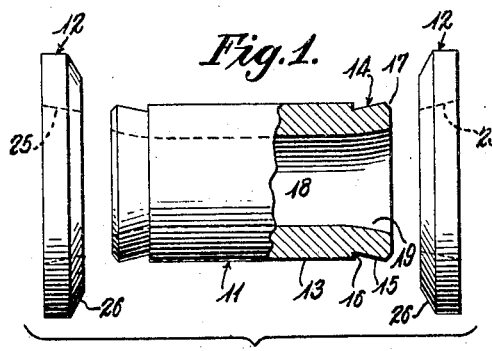
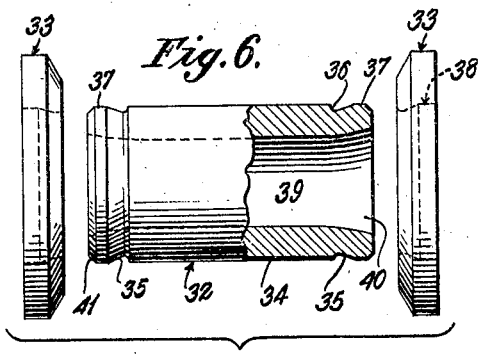
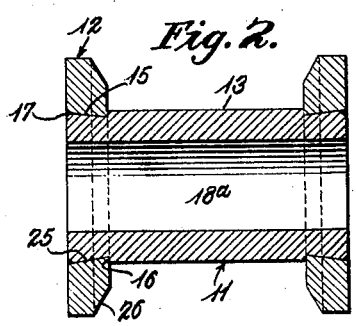
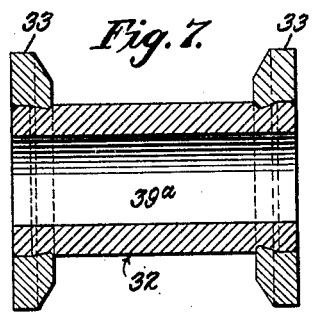
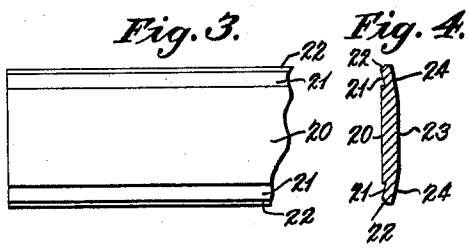
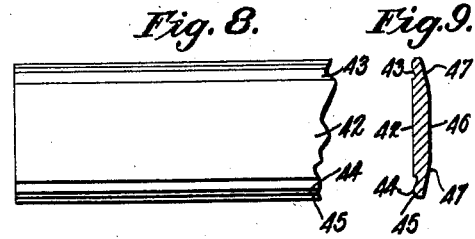
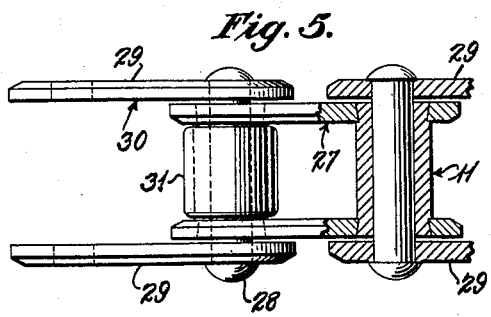
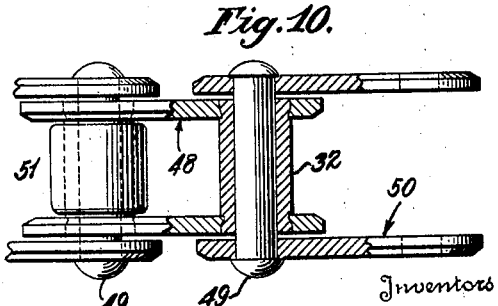
Inventors
Jerrus M. Bryant
Herbert A. McAninch
By L. Donald Myyro
Attorney Patented Apr. 25, 1939

2,155,584

UNITED STATES PATENT OFFICE 2,155,584

METHOD OF MAKING BUSHINGS AND BUSHED CHAIN LINKS AND THE ARTICLES PRODUCED BY SAID METHOD

Jerrus M. Bryant and Herbert A. McAninch, Indianapolis, Ind., assignors to Link-Belt Company, a corporation of Illinois Application April 19, 1938, Serial No. 202,976

20 Claims. (Cl. 59—8)

This invention relates to new and useful improvements in methods for making bushings and bushed chain links including said bushings as well as the articles produced by said methods. The bushings and bushed links produced by these methods may be provided either with or be employed without sprocket teeth engaging rollers and are best suited for use in high speed drive chains and in conveyor or drive chains intended to handle heavy loads.

In chain links of the type in which the ends of the bushings are fitted in pitch holes of side bars, it is very desirable to employ some form of connection which will prevent the bushings from turning in their pitch holes and which will prevent the side bars from tending to walk off the ends of the bushings.

Probably the method most commonly practiced by chain manufacturers to provide a connection between the ends of the bushings and the side bars involves the forming of a press fit between these elements. The press fit is supposed to be of such a degree of tightness, theoretically at least, as to maintain the bushings and side bars connected in a manner to prevent turning of the bushings and separation of the side bars from the bushings during use of the links in chain assemblies. This press fit type of connection, due, possibly, to the tolerances which must be allowed for quantity production, the tendency of the fitted surfaces of the bushings and side bars to taper, and/or the tendency to stress the material beyond the point of elasticity or yield resulting in permanent distortion, does not function with a uniform degree of success to accomplish the intended result over a prolonged period of use because the side bars still do have a tendency to walk off of the bushings.

This press fit type of connection also causes the end portions of the bushings to be contracted with the result that the end regions of the bushing bores are closed in or reduced in diameter to a sufficient extent to destroy the desired uniform bushing bore diameter and materially modify the bearing surface or area provided by such bores. The effect of this non-uniform bore diameter condition is to reduce the unit bearing area which a bushing presents to the chain pin passing therethrough. This decrease in bearing area results in dangerously increasing unit bearing pressures and concentration of load at the contracted end portions of the bushing. Such a load concentration naturally results in more rapid wear. As the partial closure of the bushing bore at its end portions reduces the normal clearance between the bushing and chain pin, free entrance of a lubricant to the bushing bore is not permitted and improper lubrication results. It will be appreciated, therefore, that a press fit type of connection not only does not function as intended, but it creates a structural defect which is extremely undesirable.

The primary object of this invention is to provide methods for constructing bushed chain links in which the bushings will be prevented from turning in the pitch holes of the side bars, the tendency of the side bars to walk off of the bushing ends will be overcome, and the bushing bores will provide maximum unit bearing areas for the chain pins passed therethrough.

A further important object of the invention is to provide methods of constructing bushings which are especially adapted to be connected at their ends to chain link side bars, or the like.

Still another object of this invention is to provide a chain link construction in which the link bushings and side bars are connected in a manner to prevent turning of the bushings and separation of the side bars from the bushings and in which the bores of the assembled bushings are of uniform diameter throughout their length.

A still further object of the invention is to provide a special or novel form of bushing which is particularly suitable for use in chain link assemblies.

Other objects and advantages of the invention will be apparent during the course of the following description.

In the accompanying drawing forming a part of this specification and in which like numerals are employed to designate like parts throughout the same, Figure 1 is an exploded view disclosing a bushing and a pair of chain link side bars prior to assembly of the same, Figure 2 is a transverse sectional view illustrating the bushing and side bars of Fig. 1 assembled, Figure 3 is a plan view of a portion of a strip of stock which has been produced for the purpose of forming from sections thereof bushings of the type disclosed in Fig. 1, Figure 4 is a transverse sectional view of the strip of special bushing stock disclosed in Fig. 3, Figure 5 is a partial plan view and partial sectional view of a portion of a chain assembly which includes links of the character disclosed in Fig. 2, Figure 6 is an exploded view illustrating a modified form of bushing and chain link side bars prior to assembly of the same, Figure 7 is a transverse sectional view illustrating a link constructed of the bushing and side bars disclosed in Fig. 6, Figure 8 is a plan view of a portion of a strip of bushing stock which has been produced especially for the purpose of constructing bushings of the character disclosed in Fig. 6, Figure 9 is a transverse sectional view of the special bushing stock disclosed in Fig. 8, and Figure 10 is a similar view to Fig. 5, but discloses a link of the character illustrated in Fig. 7 as a part of the chain assembly.

The ten figures of the drawing discloses the essential or principal method steps involving the forming of two different forms of special bushings, two modified forms of chain links in which the two special bushings are incorporated and sections of chain assemblies including the two modified forms of chain links. The chain links illustrated in the drawing are of the type which is commonly known as inside links in which a pair of side bars are connected by a pair of bushings. There are several other conventional and commonly used forms of chain links which include as a part of the same one or more bushings which are connected to side bars. For example, another common form of chain link is known as an offset link and this type of link only employs a bushing at one end. The side bars at the remaining end of the link are connected by a chain pin. It is to be understood that the methods disclosed and described herein as being suitable for the formation of inside links also are equally applicable to the formation of all other types of links in which bushings are secured to side bars.

Referring first to the disclosure of Figs. 1 to 5, there is disclosed in Fig. 1 a bushing 11 which has been constructed in readiness to be connected with side bars 12. As illustrated, the bushing 11 includes a central body portion 13, the wall of which is of uniform thickness to provide a peripheral surface of uniform diameter throughout its length. Each end portion of the bushing 13 is provided with an annular, peripheral groove 14 which is formed by the tapered surface 15 and the shoulder 16. The surface 15 is tapered inwardly or toward the center of the bushing so that the larger diameter of the groove 14 is positioned adjacent the end of the bushing. The extreme peripheral edge of the bushing is beveled or chamfered at 17 to eliminate the sharp edge which otherwise would be provided and which might tend to act as a broach when the end of the bushing is forced into a pitch hole of a side bar. As will be seen, both ends of the bushing 11 are of identical construction.

The bore 18 of the bushing is of normal or intended diameter throughout the major portion of its length. Each end portion of the bore 18, however, is provided with an outwardly flared relief area 19 which, preferably, is formed with an axially curved wall surface.

It will be appreciated that this bushing may be constructed in several ways. For example, it can be formed of a section cut from a piece of tubular stock and machined to provide the counterbored relief areas 19, the groove formed by the angularly arranged surfaces 15 and 16, and the beveled or rounded edges 17. This bushing also could be formed by cutting a section from a piece of solid round stock and then bored and machined to provide the desired configuration.

The preferred method, however, is to form the bushing by curling a section of special bushing stock of strip formation. Figs. 3 and 4 disclose a portion of a strip of stock which has been properly shaped by rolling, or the like, to form in the surface 20 the longitudinally extending grooves 21 and the chamfered longitudinal edges 22. The remaining face 23 is provided with the chamfered longitudinal regions 24 which are formed by transversely curved surfaces. A section of suitable length is cut from this strip of Figs. 3 and 4, and is curled in any desired and conventional manner to form the bushing of Fig. 1. Proper curling of this section of bushing stock presents the grooves 21 to the periphery of the bushing to form the bushing grooves 14, while the chamfered regions 24 are positioned to form the flared counterbored portions or relief areas 19 at the ends of the bushing bore 18.

The side bars 12 of Fig. 1 are provided with pitch holes 25 which are tapered in the same direction as the tapered surfaces 15 of the bushing grooves 14; however, the angularity of these two surfaces need not be exactly the same. For example, it has been determined that a difference in angularity will effect a more uniform press fit from end to end of these surfaces. The edges 26 on the inner side of the side bars are beveled, as illustrated.

The average diameter of the tapered pitch holes 25 is intended to bear a very definite relationship with respect to the average diameter of the tapered surfaces 15 of the bushing grooves 14. The diameter of the pitch hole 25 should be sufficiently smaller than the diameter of the tapered groove surface 15 to provide a press fit between the end of the bushing and the wall of the side bar pitch hole when the bushing end is forced into the said pitch hole.

In assembling the side bars on the ends of the bushing, the end portions of the bushing, naturally, are distorted or contracted to permit the large extremities of the bushing to pass through the smaller ends of the tapered pitch holes. The contracted end portions of the bushing, however, spring outwardly again when the side bars are properly seated with their inner faces bearing against the shoulders 16 formed by the bushing grooves 14. The diameters of the pitch holes 25, however, are such that the end portions of the bushing will not be permitted to spring back to their normal or original diameters or sizes. In other words, even after the end regions of the bushings are properly positioned within the pitch holes 25, they will be maintained under compression to provide press fit of a desired degree of tightness to prevent turning of the bushing relative to the side bars. It will be appreciated that the arrangement of the tapered pitch holes 25 and the tapered surfaces 15 of the bushing grooves 14 will cooperate to lock the side bars against any tendency to walk off of the ends of the bushing. There is provided, therefore, a press fit between each side bar and its bushing which will prevent turning of the bushing relative to the side bar and a form of interlocking connection between the bushing end and its side bar which will prevent separation of these two elements. Although the press fit is not such that it will provide the same maximum degree of tightness as is provided in a press fit of the type formerly employed; i. e., where no interlocking connection is provided, it does provide, when the angularities are not identical, a more uniform tightness and, therefore, a more effective gripping action. The press fit is, however, of a sufficient degree of tightness to be accompanied by a displacement of the material of the bushing ends. The bushing material is caused to flow or be crowded radially inwardly and results in a partial closure or contracting of the ends of the bushing bore. The flared relief areas 19, shown at the ends of the bushing bore in Fig. 1, permit this inward contracting of the bushing ends to take place without resulting in the formation of areas at the ends of the bushing bore which are of reduced diameter as compared to the diameter of the central or middle portion of said bore. It is possible to calculate the amount or degree of contraction which will be produced by a press fit of a given degree of tightness. The flared or counterbored relief areas 19, therefore, should be of a proper diameter to produce a bushing bore of uniform diameter throughout its length after the ends of the bushing are contracted by the press fit.

Fig. 2 discloses the construction or appearance of the bushing 11 and side bars 12 of Fig. 1 after they have been properly assembled. The bushing 11 now has a bore 18a which is of uniform diameter throughout its length. This bore 18a, therefore, will provide a maximum amount of bearing area for a chain pin positioned therein. As there will not be present any areas of reduced diameter, the load will not be concentrated at any particular point or points, but will be uniformly borne by the entire bearing area. The proper amount of clearance will be provided at the ends of the bushing to allow for free entrance of a lubricant and due to this proper lubrication and the absence of any concentration of loads on limited areas, only normal wearing of the parts will occur.

Fig. 5 discloses a section of a chain assembly which includes an inside link 27 constructed in accordance with the method disclosed and described in connection with the preceding figures. The opposite ends of this inside link 27 are connected by the chain pins 28 to the side bars 29 of the two adjacent outside links 30. These chain pins 28 are riveted, or otherwise formed at their ends, to maintain the links assembled. One of the bushings 11 of the chain assembly shown in Fig. 5 is illustrated as being provided with a sprocket engaging roller 31 while the remaining bushing 11 is illustrated without such a roller. This method has been adopted to disclose the fact that this bushing and side bar construction may be employed in chains which either do or do not include sprocket teeth engaging rollers.

Figs. 6 to 10, inclusive, disclose, in a similar manner to Figs. 1 to 5, inclusive, a method of forming a slightly modified form of chain link and chain bushing. To avoid prolixity in describing this modification, only such structural features which differ from the similar features of the disclosed method and structure of Figs. 1 to 5 will be specifically described. The common features will be referred to only in a general way, and it is to be understood that the description given in connection with the disclosure of Figs. 1 to 5 applies with equal force to the disclosure of Figs. 6 to 10, inclusive.

Fig. 6 discloses a bushing 32 which is intended to be connected to the two side bars 33. The bushing has a central body portion 34 similar in every respect to the body portion 13 of the bushing 11, disclosed in Fig. 1. The end portions of this bushing 32, however, differ in construction to the end portions of the bushing 11. The grooves 35 are not as wide as the grooves 14 and are provided with rounded bottom portions 36. These grooves 35 are spaced inwardly from the ends of the bushing a sufficient extent to leave an annular band 37 which has a diameter, preferably, corresponding with the diameter of the central portion 34 of the bushing.

The pitch holes 38 of the side bars 33 are formed with walls corresponding in contour or section with the grooved end portions of the bushing 32 including the cylindrical bands 37.

It will be seen, therefore, that each end of the bushing 32 is provided with a groove having a tapered wall and an outwardly positioned band having a cylindrical wall. The pitch holes 38 of the side bars 33 also are formed with corresponding tapered and cylindrical wall sections or portions.

Each end of the bore 39 of the bushing 32 is flared or counterbored, as at 40, to provide a relief area which functions in the same manner as the relief area 19 of the Fig. 1 bushing. The extremities of the bushing 32 have their edges beveled or chamfered, as at 41, to prevent broaching of the pitch holes 38 when the bushing ends are pressed into the side bars.

Fig. 7 discloses the bushing 32 of Fig. 1 assembled with respect to the side bars 33. Due to the same action that was described in connection with Figs. 1 to 2, the press fitting of the ends of the bushing 32 within the pitch holes of the side bars 33 results in contraction of the end portions of the bushing to fill in or close up the relief areas 40 to provide a bushing bore 39a which is of uniform diameter throughout its length. The assembled chain structure of Fig. 7, therefore, includes an interlocking connection between the side bars 33 and the ends of the bushing 32 which will prevent the side bars from having a tendency to walk off the ends of the bushing. The press fit provided between the ends of the bushing and the walls of the pitch holes 38 will be of a proper character to prevent the bushing 32 from turning with respect to the side bars. The closing in of the end regions of the bushing bore by the press fitting of the bushing within the pitch holes will provide a bushing bore possessing a maximum bearing area and which will not have any contracted or reduced areas at its opposite ends.

As was explained in connection with bushing 11 of Fig. 1, bushing 32 may be formed either by machining a proper section of tubular stock or a proper section of solid round stock. It is preferred, however, to form bushing 32 from a rolled strip of special bushing stock of the type disclosed in Figs. 8 and 9.

This bushing strip has its face 42 formed with the grooves 43, the flat bands 44, and the chamfered or beveled longitudinal edges 45. The remaining face 46 of the strip has its longitudinal edges 47 chamfered as shown.

It will be obvious that a section of the bushing stock shown in Figs. 8 and 9 is to be curled into a tubular bushing with the surface 42 and its grooves 43 and bands 44 forming the peripheral surface of the bushing. This, of course, will arrange the surface 46 and its chamfered longitudinal edges 47 so as to form the bushing bore 39 with its relief areas 40.

Fig. 10 discloses a section of a chain which includes an inside link 48 formed in accordance with the disclosures of Figs. 6 to 9, inclusive, and which is connected by chain pins 49 to the side bars of outside links 50. A sprocket tooth engaging roller 51 is provided for one of the bushings of the inside link 48. As was explained in connection with Fig. 5, the remaining bushing 32 is not illustrated as having a roller for the purpose of disclosing the adaptability of this type of link structure for roller and non-roller types of chains.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. A method of constructing bushed chain links which comprises the steps of forming a bushing with an annular exterior groove adjacent each end and with an annular internal relief area at each end of its bore which extends axially of the bushing a distance substantially coextensive with the thickness of a side bar to be applied to the bushing, forming a pair of side bars with pitch holes, the walls of said pitch holes having a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect flow of the material of the bushing ends radially inwardly to fill in said relief areas.

2. A method of constructing bushed chain links which comprises the steps of forming a bushing with an annular exterior groove adjacent each end and with the central or middle portion of its bore of a desired final diameter and the end portions having diameters greater than said desired diameter to form relief areas each of which extends axially of the bushing a distance substantially coextensive with the thickness of a side bar to be applied to the bushing, forming a pair of side bars with pitch holes, the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect contracting of the material of the bushing ends radially inwardly to reduce the diameter of said relief areas to substantially the diameter of the central or middle portion of the bushing bore.

3. A method of constructing bushed chain links which comprises the steps of forming a bushing with an annular exterior groove of varying depth adjacent each end and an annular internal relief area of varying depth at each end of its bore which extends axially of the bushing a distance substantially coextensive with the thickness of a side bar to be applied to the bushing, forming a pair of side bars with pitch holes the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect flow of the material of the bushing ends radially inwardly to fill in said relief areas.

4. A method of constructing bushed chain links which comprises the steps of forming a bushing with an annular exterior groove of varying depth adjacent each end and with the central or middle portion of its bore of a desired final diameter and the end portions each having an annular relief area which increases in diameter from the central or middle portion outwardly to the bushing end and which extends axially of the bushing a distance substantially coextensive with the thickness of a side bar to be applied to the bushing, forming a pair of side bars with pitch holes the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect contracting of the material of the bushing ends radially inwardly to reduce the diameter of said relief areas to substantially the diameter of the central or middle portion of the bushing bore.

5. A method of constructing bushed chain links which comprises the steps of forming a bushing with an annular exterior groove spaced inwardly of each end sufficiently to leave a cylindrical band and an annular internal relief area at each end of its bore which extends axially of the bushing a distance substantially coextensive with the thickness of a side bar to be applied to the bushing, forming a pair of side bars with pitch holes the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect flow of the material of the bushing ends radially inwardly to fill in said relief areas.

6. A method of constructing bushed chain links which comprises the steps of forming a bushing with an annular exterior groove spaced inwardly of each end sufficiently to leave a cylindrical band and with the central or middle portion of its bore of a desired final diameter and the end portions having diameters greater than said desired diameter to form relief areas each of which extends axially of the bushing a distance substantially coextensive with the thickness of a side bar to be applied to the bushing, forming a pair of side bars with pitch holes the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect contracting of the material of the bushing ends radially inwardly to reduce the diameter of said relief areas to substantially the diameter of the central or middle portion of the bushing bore.

7. A method of constructing bushed chain links which comprises the steps of forming a bushing with an annular exterior groove of varying depth spaced inwardly of each end to leave a cylindrical band and an annular internal relief area of varying depth at each end of its bore which extends axially of the bushing a distance substantially coextensive with the thickness of a side bar to be applied to the bushing, forming a pair of side bars with pitch holes the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect flow of the material of the bushing ends radially inwardly to fill in said relief areas.

8. A method of constructing bushed chain links which comprises the steps of forming a bushing with an annular exterior groove of varying depth spaced inwardly of each end sufficiently to leave a cylindrical band and with the central or middle portion of its bore of a desired final diameter and the end portions each having a relief area which increases in diameter from the central or middle portion outwardly to the bushing end and which extends axially of the bushing a distance substantially coextensive with the thickness of a side bar to be applied to the bushing, forming a pair of side bars with pitch holes the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect contracting of the material of the bushing ends radially inwardly to reduce the diameter of said relief areas to substantially the diameter of the central or middle portion of the bushing bore.

9. A method of constructing bushed chain links which comprises the steps of forming a bushing with an annular exterior groove adjacent each end and with counterbored relief areas at the ends of its bore each of which extends axially of the bushing a distance substantially coextensive with the thickness of a side bar to be applied to the bushing, forming a pair of side bars with pitch holes the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect flow of the material of the bushing ends radially inwardly to fill said relief areas.

10. A method of constructing bushed chain links which comprises the steps of shaping a strip of bushing stock so as to form in one face a longitudinally extending groove positioned adjacent each longitudinal edge and so as to chamfer the longitudinal edges of the other face, said chamfering having a width at least equal to that of the groove, curling a section of said shaped stock into bushing form with the grooves and chamfered edges occurring at the ends of the bushing and arranged with the grooves positioned exteriorly and with the chamfered edges forming relief areas in the bushing bore, forming a pair of side bars with pitch holes the walls of which have a contour corresponding in shape with the shape of the grooved end portions of the bushing, and press fitting the ends of the bushing into the side bar pitch holes to cause the bushing grooves and the pitch hole contours to lock the bushing and side bars against separation and to cause the tightness of the press fit to prevent turning of the bushing as well as to effect flow of the material of the bushing ends radially inwardly to fill said relief areas.

11. A method of constructing bushings for chain links, or the like, which comprises forming a tubular bushing blank, shaping the exterior of said blank to provide an annular groove adjacent each end, and shaping the bore of said blank to provide an annular relief area at each end thereof which extends into the bore at least as far as the inner edge of said groove.

12. A method of constructing bushings for chain links, or the like, which comprises forming a tubular bushing blank, shaping the exterior of said blank to provide an annular groove spaced inwardly of each end sufficiently to leave a band of normal diameter outwardly of the groove, and shaping the bore of said blank to provide an annular relief area at each end thereof which extends into the bore at least as far as the inner edge of said groove.

13. A method of constructing bushings for chain links, or the like, which comprises the steps of shaping a strip of bushing stock so as to form in one face a longitudinally extending groove positioned adjacent each longitudinal edge and to chamfer the longitudinal edges of the other face, said chamfering having a width at least equal to that of the groove, and curling a section of said shaped stock into bushing form with the grooves and chamfered edges occurring at the ends of the bushing and arranged with the grooves positioned exteriorly and the chamfered edges positioned to form relief areas in the bushing bore.

14. A bushed chain link comprising a tubular bushing having an exterior annular groove adjacent each end, and a pair of side bars having pitch holes formed therein the walls of which have a contour in section which corresponds with the shape of the grooved end portions of said bushing, press fitted onto said bushing ends, whereby the grooves of the bushing and the contour of the pitch holes will lock the bushing and side bars against separation and the press fit will prevent turning of the bushing in the pitch holes, said press-fitted bushing having a bore of uniform diameter throughout its length.

15. A bushed chain link comprising a tubular bushing having adjacent each end portion a tapered peripheral groove, and a pair of side bars having pitch holes formed with tapered wall portions to correspond with said tapered grooves press fitted onto said bushing ends, whereby the grooves of the bushing and the contour of the pitch holes will lock the bushing and side bars against separation and the press fit will prevent turning of the bushing in the pitch holes, said press-fitted bushing having a bore of uniform diameter throughout its length.

16. A bushed chain link comprising a tubular bushing having adjacent each end portion an inwardly tapering peripheral groove spaced from the bushing end to leave a band of normal diameter, and a pair of side bars having pitch holes formed with walls shaped to correspond in section with the shape of the tapered grooves and bands of the bushing ends pressed fitted onto said bushing ends, whereby the grooves of the bushing and the contour of the pitch holes will lock the bushing and side bars against separation and the press fit will prevent turning of the bushing in the pitch holes, said press-fitted bushing having a bore of uniform diameter throughout its length.

17. A bushing for a chain link, or the like, comprising a tubular body having a radially enlarged annular relief area formed in each end of its bore, and an annular groove in its periphery adjacent each end portion, said relief areas each having a width at least equal to that of a groove.

18. A bushing for a chain link, or the like, comprising a tubular body having an outwardly flaring annular relief area formed in each end of its bore, and an annular groove in its periphery adjacent each end portion said relief areas each having a width at least equal to that of a groove.

19. A bushing for a chain link, or the like, comprising a tubular body having a radially enlarged annular relief area formed in each end of its bore, and an annular inwardly tapering groove in its periphery adjacent each end, said relief areas each having a width at least equal to that of a groove.

20. A bushing for a chain link, or the like, comprising a tubular body having an outwardly flaring annular relief area formed in each end of its bore, and an annular inwardly tapering groove in its periphery adjacent each end portion, said relief areas each having a width at least equal to that of a groove.

JERRUS M. BRYANT.
HERBERT A. McANINCH.